(12) United States Patent
Gates et al.

(10) Patent No.: US 7,464,756 B2
(45) Date of Patent: Dec. 16, 2008

(54) PROCESS FOR IN SITU RECOVERY OF BITUMEN AND HEAVY OIL

(75) Inventors: Ian Donald Gates, Calgary (CA); Anthony Martin Harold Gutek, Calgary (CA)

(73) Assignee: Exxon Mobil Upstream Research Company, Houston, TX (US)

( * ) Notice: Subject to any disclaimer, the term of this patent is extended or adjusted under 35 U.S.C. 154(b) by 217 days.

(21) Appl. No.: 11/050,965

(22) Filed: Feb. 4, 2005

(65) Prior Publication Data

US 2005/0211434 A1    Sep. 29, 2005

(30) Foreign Application Priority Data

Mar. 24, 2004    (CA) ................................... 2462359

(51) Int. Cl.
    *E21B 43/24* (2006.01)
(52) U.S. Cl. ............... 166/272.3; 166/263; 166/272.4; 166/401
(58) Field of Classification Search ............. 166/272.1, 166/272.3, 272.4, 401, 263
    See application file for complete search history.

(56) References Cited

U.S. PATENT DOCUMENTS

| | | | |
|---|---|---|---|
| 2,365,591 A | 12/1944 | Ranney | 262/1 |
| 3,608,638 A | 9/1971 | Terwilliger | 166/272 |
| 3,908,762 A | 9/1975 | Redford | 166/263 |
| 3,960,214 A | 6/1976 | Striegler et al. | 166/272 |
| 3,986,557 A | 10/1976 | Striegler et al. | 166/272 |
| 4,004,636 A | 1/1977 | Brown et al. | 166/272 |
| 4,007,785 A | 2/1977 | Allen et al. | 166/263 |
| 4,020,901 A | 5/1977 | Pisio et al. | 166/50 |
| 4,026,358 A | 5/1977 | Allen | 166/261 |
| 4,034,812 A | 7/1977 | Widmyer | 166/303 |
| 4,037,658 A | 7/1977 | Anderson | 166/272 |
| 4,067,391 A | 1/1978 | Dewell | 166/303 |
| 4,078,608 A * | 3/1978 | Allen et al. | 166/266 |
| 4,085,803 A | 4/1978 | Butler | 166/303 |

(Continued)

FOREIGN PATENT DOCUMENTS

CA    1015656    8/1977

(Continued)

OTHER PUBLICATIONS

Batycky, J. (1997) "An Assessment of In situ Oil Sands Recovery Processes", *The Journal of Canadian Petroleum Technology*, vol. 36, No. 9, pp. 15-19, Oct. 1997.

(Continued)

*Primary Examiner*—Giovanna C Wright

(57) ABSTRACT

A process is described for in situ recovery of bitumen or heavy oil from a reservoir having a horizontal injection well and a horizontal production well. The process includes a first phase in which steam and a heavy hydrocarbon solvent are injected into the reservoir, a second phase in which the steam and heavy hydrocarbon injections are transitioned to a light hydrocarbon solvent injection, and a third phase in which a light hydrocarbon solvent is injected without further steam or heavy hydrocarbon injection. A displacement gas may be added during any of the phases, and production of hydrocarbons continues throughout all phases. The process employs a high-production start-up phase, followed by lower cost phases which progress a depletion chamber within the reservoir.

17 Claims, 5 Drawing Sheets

U.S. PATENT DOCUMENTS

| | | | | |
|---|---|---|---|---|
| 4,099,568 A | 7/1978 | Allen | | 166/269 |
| 4,109,720 A | 8/1978 | Allen et al. | | 166/269 |
| 4,116,275 A | 9/1978 | Butler et al. | | 166/303 |
| 4,127,170 A | 11/1978 | Redford | | 166/252 |
| 4,160,481 A | 7/1979 | Turk et al. | | 166/272 |
| 4,166,503 A | 9/1979 | Hall et al. | | 166/263 |
| 4,257,650 A | 3/1981 | Allen | | 299/2 |
| 4,262,745 A | 4/1981 | Stewart | | 166/263 |
| 4,280,559 A | 7/1981 | Best | | 166/303 |
| 4,293,035 A | 10/1981 | Fitch | | 166/273 |
| 4,296,969 A | 10/1981 | Willman | | 299/2 |
| 4,324,291 A | 4/1982 | Wong et al. | | 166/252 |
| 4,344,485 A | 8/1982 | Butler | | 166/271 |
| 4,372,383 A | 2/1983 | Ames | | 166/266 |
| 4,373,585 A | 2/1983 | Fitch et al. | | 166/263 |
| 4,379,592 A | 4/1983 | Vakhnin et al. | | 299/2 |
| 4,385,662 A | 5/1983 | Mullins et al. | | 166/263 |
| 4,390,067 A | 6/1983 | Willman | | 166/245 |
| 4,434,849 A | 3/1984 | Allen | | 166/252 |
| 4,450,913 A | 5/1984 | Allen et al. | | 166/303 |
| 4,460,044 A | 7/1984 | Porter | | 166/252 |
| 4,463,988 A | 8/1984 | Bouck et al. | | 299/2 |
| 4,466,485 A | 8/1984 | Shu | | 166/272 |
| 4,498,537 A | 2/1985 | Cook | | 166/257 |
| 4,501,326 A | 2/1985 | Edmunds | | 166/272 |
| 4,510,997 A | 4/1985 | Fitch et al. | | 166/263 |
| 4,511,000 A | 4/1985 | Mims | | 166/303 |
| 4,513,819 A | 4/1985 | Islip et al. | | 166/263 |
| 4,519,454 A | 5/1985 | McMillen | | 166/303 |
| 4,535,845 A | 8/1985 | Brown et al. | | 166/272 |
| 4,565,245 A | 1/1986 | Mims et al. | | 166/50 |
| 4,577,691 A | 3/1986 | Huang et al. | | 166/263 |
| 4,589,486 A | 5/1986 | Brown et al. | | 166/252 |
| 4,598,770 A | 7/1986 | Shu et al. | | 166/245 |
| 4,640,359 A | 2/1987 | Livesey et al. | | 166/276 |
| 4,682,652 A | 7/1987 | Huang et al. | | 166/263 |
| 4,687,058 A | 8/1987 | Casad et al. | | |
| 4,697,642 A | 10/1987 | Vogel | | 166/263 |
| 4,700,779 A | 10/1987 | Huang et al. | | 166/263 |
| 4,706,751 A | 11/1987 | Gondouin | | 166/272 |
| 4,753,293 A | 6/1988 | Bohn | | 166/267 |
| 4,794,987 A | 1/1989 | Kokolis et al. | | 166/274 |
| 4,818,370 A | 4/1989 | Gregoli et al. | | 208/106 |
| 4,834,179 A | 5/1989 | Kokolis et al. | | 166/268 |
| 4,844,158 A | 7/1989 | Jennings, Jr. | | 166/267 |
| 4,850,429 A | 7/1989 | Mims et al. | | 166/245 |
| 4,878,539 A | 11/1989 | Anders | | |
| 5,014,784 A | 5/1991 | Shen | | |
| 5,016,709 A | 5/1991 | Combe et al. | | |
| 5,033,546 A | 7/1991 | Combe | | |
| 5,036,915 A | 8/1991 | Wyganowski | | |
| 5,056,596 A | 10/1991 | McKay et al. | | |
| 5,060,726 A | 10/1991 | Glandt et al. | | 166/248 |
| 5,145,002 A | 9/1992 | McKay | | |
| 5,148,869 A | 9/1992 | Sanchez | | 166/303 |
| 5,167,280 A | 12/1992 | Sanchez et al. | | 166/267 |
| 5,215,146 A | 6/1993 | Sanchez | | 166/263 |
| 5,215,149 A | 6/1993 | Lu | | 166/303 |
| 5,244,041 A | 9/1993 | Renard et al. | | 166/268 |
| 5,273,111 A | 12/1993 | Brannan et al. | | 166/245 |
| 5,289,881 A | 3/1994 | Schuh | | |
| 5,318,124 A | 6/1994 | Ong et al. | | |
| 5,339,897 A | 8/1994 | Leaute | | 166/245 |
| 5,407,009 A | 4/1995 | Butler et al. | | 166/266 |
| 5,411,094 A | 5/1995 | Northrop | | 166/303 |
| 5,413,175 A | 5/1995 | Edmunds | | 166/252 |
| 5,417,283 A | 5/1995 | Ejiogu et al. | | 166/272 |
| 5,450,902 A | 9/1995 | Matthews | | |
| 5,456,315 A | 10/1995 | Kisman et al. | | 166/245 |
| 5,503,226 A | 4/1996 | Wadleigh | | 166/252.1 |
| 5,607,016 A | 3/1997 | Butler | | 166/263 |
| 5,607,018 A | 3/1997 | Schuh | | |
| 5,626,193 A | 5/1997 | Nzekwu et al. | | 166/303 |
| 5,655,605 A | 8/1997 | Matthews | | |
| 5,685,371 A | 11/1997 | Richardson et al. | | 166/272 |
| 5,771,973 A | 6/1998 | Jensen et al. | | 166/303 |
| 5,803,171 A | 9/1998 | McCaffery et al. | | 166/245 |
| 5,826,655 A | 10/1998 | Snow et al. | | 166/272.3 |
| 5,860,475 A | 1/1999 | Ejiogu et al. | | 166/245 |
| 5,899,274 A | 5/1999 | Frauenfeld et al. | | 166/401 |
| 5,931,230 A | 8/1999 | Lesage et al. | | 166/303 |
| 5,957,202 A | 9/1999 | Huang | | |
| 6,050,335 A | 4/2000 | Parsons | | 166/272.3 |
| 6,119,776 A | 9/2000 | Graham et al. | | 166/245 |
| 6,158,510 A | 12/2000 | Bacon et al. | | 166/272.7 |
| 6,167,966 B1 | 1/2001 | Ayasse et al. | | 166/268 |
| 6,186,232 B1 | 2/2001 | Isaacs et al. | | 166/272.3 |
| 6,230,814 B1 | 5/2001 | Nasr et al. | | 166/400 |
| 6,257,334 B1 | 7/2001 | Cyr et al. | | 166/272.7 |
| 6,263,965 B1 | 7/2001 | Schmidt et al. | | 166/272.3 |
| 6,305,472 B2 | 10/2001 | Richardson et al. | | 166/305.1 |
| 6,318,464 B1 | 11/2001 | Mokrys | | 166/252.01 |
| 6,357,526 B1 | 3/2002 | Abdel-Halim et al. | | |
| 6,412,557 B1 | 7/2002 | Ayasse et al. | | |
| 6,591,908 B2 | 7/2003 | Nasr | | |
| 6,708,759 B2 | 3/2004 | Leaute et al. | | |
| 6,729,394 B1 | 5/2004 | Hassan et al. | | |
| 6,769,486 B2 | 8/2004 | Lim et al. | | |
| 6,883,607 B2 | 4/2005 | Nenniger et al. | | |
| 6,988,549 B1 | 1/2006 | Babcock | | |
| 2001/0018975 A1 | 9/2001 | Richardson et al. | | |
| 2003/0000711 A1* | 1/2003 | Gutek et al. | | 166/402 |
| 2005/0145383 A1 | 7/2005 | Nenniger et al. | | |

FOREIGN PATENT DOCUMENTS

| | | |
|---|---|---|
| CA | 1059432 | 7/1979 |
| CA | 1102234 | 2/1981 |
| CA | 1112115 | 4/1982 |
| CA | 1304287 | 6/1992 |
| CA | 2015460 | 12/1993 |
| CA | 2108349 | 8/1996 |
| CA | 2147079 | 10/1996 |
| CA | 2185837 | 3/1998 |
| CA | 2270703 | 4/1999 |
| CA | 2241478 A1 | 12/1999 |
| CA | 2304938 | 2/2001 |
| CA | 2 299 790 A1 | 8/2001 |
| CA | 2 332 685 A1 | 9/2001 |
| CA | 2243105 | 11/2001 |
| CA | 2391721 | 6/2002 |
| CA | 2 351 148 A1 | 12/2002 |
| CA | 2 251 157 | 5/2003 |
| CA | 2325777 | 5/2003 |
| CA | 2323029 | 3/2004 |
| CA | 2 235 085 | 1/2007 |
| CA | 2281276 | 2/2007 |
| CA | 2 461 237 A1 | 8/2007 |

OTHER PUBLICATIONS

Briggs, P.J. et al. (1992) "Heavy Oil from Fractured Carbonate Reservoirs", *Society of Petroleum Engineers, Inc.*, SPE No. 19671, May 1992.

Butler, R.M., "SAGD Comes of Age", *JCPT*.

Butler, R.M. (1997) "Steam and Gas Push (SAGP)", *The Petroleum Society*, Paper No. 97-137, pp. 1-15, Jun. 8-11, 1997.

Butler, R.M. (1997) "Thermal Recovery of Oil and Bitumen", Grav-Drain Inc., Calgary, Alberta, 11 pgs.

Butler, R.M. (1997) "Application of SAGD, Related Processes Growing in Canada", *Oil and Gas Journal*, pp. 74-78, May 14, 2001.

Butler, R.M. and Jiang (2000) "Improved Recovery of Heavy Oil by Vapex with Widely Spaced Horizontal Injectors and Producers", *J. Can. Pet. Tech.*, 39(1): pp. 48-56.

Butler, R.M. and Yee, C.T. (1986) "An Experimental Study of Steam Condensation in the Presence of Non-condensable Gases in Porous Solids", *AOSTRA Journal of Research*, vol. 3, No. 1, pp. 15-23, 1986.

Butler, R.M. and Yee, C. T. (2000) "Progress in the In Situ Recovery of Heavy Oils and Bitumen", Petroleum Society—Canadian Institute of Mining, Metallurgy & Petroleum, Paper No. 2000-50, Jun. 4-8, 2000.

Butler, R.M. and Mokrys, I.J. (1990) "A New Process (VAPEX) for Recovering Heavy Oils using Hot Water and Hydrocarbon Vapour", *Petr. Soc. of CIM/Society of Pet. Eng.*, Paper # CUM/SPE 90-133, pp. 133.1-133.15, Jun. 10-13, 1990.

Butler, R.M. and Mokrys, I.J. (1991) "A New Process (VAPEX) for Recovering Heavy Oils Using Hot Water and Hydrocarbon Vapour", *J. Can. Pet. Tech.*, 30(1): pp. 97-106.

Butler, R.M. and Mokrys, I.J. (1993)"Recovery of Heavy Oils Using Vapourized Hydrocarbon Solvents: Further Development of the Vapex Process", *J. Can. Pet. Tech.*, 32(6): pp. 56-62.

Butler, R.M. et al. (1995) "The Solvent Requirements for Vapex Recovery", Society of Petroleum Engineers, Inc., SPE No. 30293, pp. 465-474, Jun. 19-21, 1995.

Butler, R.M. et al. (1999) "Steam and Gas Push (SAGP) -3; Recent Theoretical Developments and Laboratory Results", *The Petroleum Society*, Paper No. 99-23, Jun. 14-18, 1999.

Butler, R.M. et al. (2000) "Natural and Gas-Lift in SAGD Production Wells", *J. Can. Pet. Tech.*, 39(1): pp. 18-29.

Chang, H.L. et al. (1990) "Performance of Horizontal-Vertical Well Combinations for Steamflooding Bottom Water Formations", *Petr. Soc. of CIM/Society of Petr. Eng.*, Paper No. CIM/SPE 90-86, pp. 86.1-86.16, Jun. 10-13, 1990.

Chang, H.L. et al. (1992) "Steamflood Applications for Marginal Heavy Oil Reservoirs with Underlying Bottom Water", *5th Unitar International Conference on Heavy Crude and Tar Sands*, pp. 193-205, 1992.

Cuthiell, D. et al. (2001) "Investigation of the Vapex Process using CT Scanning and Numerical Simulation", *Petroleum Soc.—Canadian Ins. of Mining, Metallurgy & Pet.*, Paper No. 2001-128, pp. 1-17, Jun. 12-14, 2001.

Das, S.K. and Butler, R. M. (1994) "Effect of Asphaltene Deposition on the Vapex Process: A Preliminary Investigation Using a Hele-Shaw Cell", *J. Can. Pet. Tech.*, 33(6): pp. 39-45.

Das, S. K. and Butler, R.M. (1995) "Extraction of Heavy Oil and Bitumen Using Solvents at Reservoir Pressure", *Petroleum Society of CIM*, Paper No. 95-118, pp. 1-15, Oct. 16-18, 1995.

Das, S.K. (1995) "In Situ Recovery of Heavy Oil and Bitumen using Vapourized Hydrocarbon Solvents", Ph.D. Thesis, University of Calgary, Calgary, Alberta, Canada.

Das, S. K. (1997) "Vapex: An Efficient Process for the Recovery of Heavy Oil and Bitumen", Society of Petroleum Engineers, Inc., SPE Paper No. 50941, pp. 232-237, Feb. 10-12, 1997.

Das, S.K. and Butler, R.M. (1996) "Countercurrent Extraction of Heavy Oil and Bitumen", Society of Petroleum Engineers, Inc., SPE No. 37094, pp. 501-510, Nov. 18-20, 1996.

Das, S.K. and Butler, R.M. (1998) "Mechanism of the Vapor Extraction Process for Heavy Oil and Bitumen", J. Pet. Sci. Eng. (21), pp. 43-59.

Das, S.K. et al. (2004) "Optimization of Solvent Injection in ES SAGD", Paper 2004-264, CIPC Conference, Calgary, Canada, 1 pg.

Davies, D.K. et al. (1997) "A Novel, Low Cost Well Completion Technique Using Steam for Formations with Unconsolidated Sands, Wilmington Field, California", *Society of Petroleum Engineers, Inc.*, SPE Paper No. 38793, pp. 433-447, Oct. 5-8, 1997.

Doan, Q. et al. (1995) "Usefulness of Scaled Models in Heavy Oil Recovery Development by Steam and Horizontal Wells", *6th UNITAR Int'l Conference*, Houston Texas, pp. 689-706, Feb. 12-17, 1995.

Donnelly, J.K. and Chmilar M.J. (1995) "The Commercial Potential of Steam Assisted Gravity Drainage", *Society of Petroleum Engineers, Inc.*, SPE No. 30278, pp. 295-308, Jun. 19-21, 1995.

Donnelly, J.K. (1999) "The Best Process for Cold Lake CSS versus SAGD", CSPG and Pet. Soc. Joint Convention, Calgary, Alberta, Canada, Paper 99-26, Jun. 14-18, 1999, 6 pgs.

Escobar, E. et al. (2000) "Optimization Methodology for Cyclic Steam Injection with Horizontal Wells", Petroleum Society—Canadian Institute of Mining, Metallurgy & Petroleum, Paper No. CIM 65525, pp. 1-12, Nov. 6-8, 2000.

Escobar, M.A. et al. (1997) "A Large Heavy Oil Reservoir in Lake Maracaibo Basin: Cyclic Steam Injection Experiences", *Society of Petroleum Engineers, Inc.*, SPE No. 37551, pp. 347-447, Feb. 10-12, 1997.

Fair, A.E. and McIntosh J.R. (1992) "Can In Situ Recovery Compete with Open Pit Mining in the Oil Sands", *AOSTRA/Canadian Heavy Oil Association*, pp. 121-132, Jun. 10-12, 1992.

Gupta, S. et al. (2001) "Insights into Some Key Issues with Solvent Aided Process", *Petroleum Society—Canadian Institute of Mining, Metallurgy & Petroleum*, Paper No. 2001-126, pp. 1-23, Jun. 12-14, 2001.

Jha, K.N. et al. (1995) "Vapour Extraction (VAPEX) Process for Recovery of Heavy Oil and Bitumen", *6th UNITAR International Conference, Houston, Texas*, pp. 759-774, Feb. 12-17, 1995.

Jiang, Q. and Butler, R.M. (1996) "Selection of Well Configurations in Vapex Process", *Society of Petroleum Engineers, Inc.*, SPE No. 37145, pp. 877-885, Nov. 18-20, 1996.

Jiang, Q. et al. (1998), "Development of the Steam and Gas Push (SAGP) Process", *GravDrain*, Paper No. 1998.59, pp. 1-18, 1998.

Jiang, Q. et al. (1998) "The Steam and Gas Push (SAGP)-2: Mechanism Analysis and Physical Model Testing", *The Petroleum Society*, Paper No. 98-43, Jun. 8-10, 1998.

Jiang, Q. et al. (2000) "Steam and Gas Push (SAGP)—4; Recent Theoretical Developments and Laboratory Results Using Layered Models", *Petr. Soc.—Canadian Inst. of Mining, Metallurgy & Petr.*, Paper No. 2000-51, Jun. 4-8, 2000.

Komery et al. (1998), "Pilot Testing of Post-Steam Bitumen Recovery from Mature SAGD Wells in Canada", Paper 1998.214, 7th UNITAR International Conference, Beijing, China, 18 pgs.

Lim, G.B. et al. (1994) "Three Dimensional Sclaed Physical Modeling of Solvent Vapour Extraction of Cold Lake Bitumen", *Canadian SPE/CIM/CANMET*, Paper No. HWC94-46, Mar. 20-23, 1994.

Lim, G.B. et al. (1995) "Cyclic Stimulation of Cold Lake Oil Sand with Supercritical Ethane", *Society of Petroleum Engineers, Inc.*, SPE Paper No. 30298, pp. 521-528, Jun. 19-21, 1995.

Luhning, R.W. and Lugning, C.P. (1999) "The Vapex Process: Non-Thermal Recovery of Birumen and Heavy Oil for Improved Economics and Climate Change Advantage", *CHOA Conference, Calgary, Alberta, Canada*, Nov. 24, 1999.

Minssieux, L. et al. (1995) "Effects of Asphaltene Deposition in Production Treatment and Prevention Tests", *International Symposium on Colloid Chemistry in Oil Production*, Nov. 26-29, 1995.

Mokrys, I.J. and Butler, R.M. (1993) "In-Situ Upgrading of Heavy Oils and Bitumen by Propane Deasphalting: The Vapex Process", *Society of Petroleum Engineers, Inc.*, SPE No. 25452, pp. 409-424, Mar. 21-23, 1993.

Nasr, T.N. et al. (1991) "A Novel Scaled Physical Simulator for Horizontal Well Enhanced Oil Recovery", *Petroleum Society of CIM and CANMET*, Paper No. 5, pp. 5-1 to 5-19, Oct. 7-9, 1991.

Nghiem, L.X. et al. (2000) "Compositional Simulation of the Vapex Process", *Petroleum Soc.—Canadian Institute of Mining, Metallurgy & Petroleum*, Paper No. 2000-34, Jun. 4-8, 2000.

Nghiem, L.X. et al. (2001) "Modeling Asphaltene Precipitation and Dispersive, Mixing in the Vapex Process", *Society of Petroleum Engineers, Inc.*, SPE Paper No. 66361, pp. 1-11, Feb. 11-14, 2001.

Palmgren et al., (1995) "High Temperature Naptha to Replace Steam in the SAGD Process", *SPE Paper 30294*, Jun. 1995, pp. 475-485.

Petit, H.J.-M. et al. (1989) "Technical and Economic Evaluation of Steam Injection with Horizontal Wells for Two Typical Heavy-Oil Reservoirs", *Society of Petroleum Engineers, Inc.*, SPE No. 19828, pp. 619-629, Oct. 8-11, 1989.

Richardson, W.C. and Chu, C. (1994) "Composition of Remaining Oil in a Mature Steamflood", *Society of Petroleum Engineers, Inc.*, SPE No. 27796, pp. 137-151, Apr. 17-20, 1994.

Saltuklaroglu et al. (1999) "Mobil's SAGD Experience at Celtic, Saskatchewan", Paper 99-25, CSPG and Petroleum Society Joint Convention, Calgary, Canada, Jun. 1999, 16 pgs.

Singhal, A.K. et al. (1996) "Screening of Reservoirs for Exploitation by Application of Steam Assisted Gravity Drainage/Vapex Processes", *Society of Petroleum Engineers, Inc.*, SPE No. 37144, pp. 867-876, Nov. 18-20, 1996.

Stone, T.W. et al. (2001) "Thermal Simulation with Multisegment Wells", *Society of Petroleum Engineers, Inc.*, SPE Paper No. 66373, pp. 1-13, Feb. 11-14, 2001.

Vogel, Jack V. (1996) "How Solvent Vapors Can Improve Steam Floods", World Oil, Nov. 1996.

Yuan, J.Y. et al. (1999) "A Wormhole Network Model of Cold Production in Heavy Oil", *Society of Petroleum Engineers, Inc.*, SPE Paper No. 54097, pp. 1-7, Mar. 17-19, 1999.

* cited by examiner

PROCESS FOR IN SITU RECOVERY OF BITUMEN AND HEAVY OIL

This application claims the benefit of Canadian Patent Application No. 2,462,359 filed on Mar. 24, 2004.

FIELD OF THE INVENTION

This invention relates to a method to improve hydrocarbon recovery from a hydrocarbon reservoir. More particularly, the invention relates to a solvent-assisted vapor extraction with steam (SAVES) process in which steam and hydrocarbon solvents of different molecular weights are injected into a well to achieve the mobilization of heavy oil or bitumen within the hydrocarbon reservoir.

BACKGROUND OF THE INVENTION

Various methods are used in the recovery of deeply buried heavy oil or bitumen deposits within oil-sands reservoirs. In situ heavy oil or bitumen recovery techniques are applied to indigenous resource that cannot be mined economically because of the depth of the overburden. It is recognized that in situ methods disturb considerably less land and therefore require less land-reclamation activity than mining projects. In situ production methods may recover between 25 and 75 percent of the initially present heavy oil or bitumen in a reservoir. In general, the focus of in situ heavy oil or bitumen recovery processes is to reduce the viscosity of the heavy oil or bitumen to enable it to be produced from a well and transported by pipeline or other means.

All existing in situ methods to recover heavy oil or bitumen deposits exploit at least one of temperature, pressure, and/or solvent to reduce bitumen viscosity or otherwise enhance the flow of bitumen within the reservoir.

One in situ recovery method is Steam Assisted Gravity Drainage (SAGD), as described in U.S. Pat. No. 4,344,485 (Butler), which requires two horizontal wells to be drilled into the reservoir. In this method, two spaced apart wells are first drilled vertically to different depths within the reservoir. Thereafter, using directional drilling technology, the two wells are extended in the horizontal direction that result in two horizontal wells, vertically spaced from, but otherwise vertically aligned with the other. Ideally, the production well is located above the base of the reservoir but as close as practical to the bottom of the reservoir, and the injection well is placed above or nearly above the production well.

The upper horizontal well is utilized as an injection well and is supplied with steam from the surface. The steam rises from the horizontal injection well, permeating the reservoir to form a vapor chamber that grows over time towards the reservoir top, thereby increasing the temperature within the reservoir. The steam (and its condensate), by soaking for a period of time, will raise the temperature and consequently reduce the viscosity of the semi-solid bitumen or heavy oil in the reservoir. The bitumen and condensed steam will then drain downward through the reservoir under the action of gravity and flow into the lower production well, whereby these liquids can be pumped to the surface. At the surface of the well, the condensed steam and bitumen are separated, and the bitumen is diluted with appropriate light hydrocarbons to transport the bitumen by pipeline to a refinery or an upgrader.

The theoretical and design concepts required to conduct successful SAGD have been published and have been extensively discussed in technical and related industry literature. A major component of the capital and operating costs of commercial SAGD operations are the facilities to: a) generate steam, b) separate hydrocarbons from condensed steam, and c) treat and recycle water to the steam generators. Current steam generators require large amounts of water, which is heated by boilers fired by natural gas to produce steam. The volume of water handled in SAGD operations is reflected in steam-to-oil ratios (e.g. CWE m3 steam/m3 bitumen) of about 2 and above for active or anticipated projects. While SAGD is effective at producing bitumen from the reservoir to the surface, there continues to be a need for systems that improve the steam-to-oil ratio of SAGD consistent with increases to the thermal efficiency of the process and improvements in the cost efficiency of the process.

A variant of the SAGD process is the Steam and Gas Push (SAGP) process. In SAGP, a non-condensable gas is co-injected with the steam to provide an insulating layer at the top of the vapour chamber. While this results in higher thermal efficiency, the non-condensable gas may add cost and complexity to the process.

The literature provides further examples of enhanced bitumen recovery using steam. For example, U.S. Pat. No. 4,519,454 (McMillen) describes a heavy oil recovery method which comprises heating the surrounding reservoir with steam at a temperature below the coking temperature but sufficient to raise the temperature by 40-200° F. (22-111° C.). Production is then initiated immediately after heating without a soak period. Production continues until steam is produced from the production well, whereafter a liquid solvent is injected into the injection well, such that a solvent and oil mixture will be produced. The process McMillen describes is essentially a cyclic thermal-solvent process alternating between thermal and solvent intervals, and usually requires several phases of costly steam injection.

U.S. Pat. No. 4,697,642 (Vogel) teaches a steam flooding and solvent flooding process in which steam and vapourized solvent are injected into the reservoir in a stepwise condensation process to recover high viscosity hydrocarbons. In this process, the choice of solvent is not considered critical and it is suggested that the solvent is a light and readily distillable liquid that is miscible with the in situ hydrocarbons. Examples include gasoline, kerosene, naphtha, gas well and plant condensates, intermediate refinery streams, benzene, toluene, and distillate and cracked products. The process makes use of a high solvent to hydrocarbon ratio which adversely impacts the economics of the process.

Palmgren (SPE Paper 30294, 1995) describes the use of high temperature naphtha to replace steam in the SAGD process. For the process to be economic and compete with SAGD, significant naphtha recovery at the end of the process is required.

A Vapour Extraction process, called VAPEX, has been proposed as a more environmentally friendly and commercially viable alternative to SAGD. In VAPEX, as in SAGD, two horizontal wells are placed in the reservoir, with the injection well located above the production well. In the VAPEX process steam is not injected, but a gaseous solvent (for example ethane, propane, or butane) is injected into the reservoir through the injection well, where it condenses and mixes with the bitumen to reduce the viscosity of the bitumen. Both bitumen and the dissolved solvent flow downward under gravity to the production well for production to the surface. The capital costs associated with the facilities for VAPEX are much less than that of SAGD because the process does not require steam generation or water treating/handling capability. The VAPEX process, however, is associated with a lengthy start-up interval due to the difficulties associated with growing a vapour chamber without steam. The potential condensation of the gaseous solvent limits the reservoir operating pressures that are permitted to maintain a vapour chamber.

Butler and Mokrys (J. Can. Pet. Tech., 30(1): 97, 1991) initially documented the VAPEX process to recover heavy oil by using hot water and a solvent vapour near its dew point in an experimental Hele-Shaw cell. The solvent dissolves into the heavy oil, reducing its viscosity, which causes it to flow along the chamber edge to the production well located low in the formation. The hydrocarbon solvent, for example propane, continues to fill the expanding chamber. The solvent is co-injected with hot water to raise the reservoir temperature by between 4° and 80° C. The hot water also re-vaporizes some of the solvent from the heavy oil to create refluxing and additional utilization of the solvent. Butler and Mokrys (J. Can. Pet. Tech., 32(6): 56, 1994) disclose further details of the VAPEX process from the results of VAPEX physical model experiments.

U.S. Pat. No. 5,607,016 (Butler) describes a variant of the VAPEX process for use in reservoirs overlying an aquifer. A non-condensable displacement gas is co-injected with a hydrocarbon solvent at sufficient pressure to limit water ingress into the recovery zone.

Das and Butler (J. Can. Pet. Tech., 33(6): 39, 1994) discuss the impact of asphaltene precipitation on the VAPEX process. One concern with previous processes has been the potential plugging of the reservoir pore space by deposited asphaltenes, which would affect the flow of diluted heavy oil to the production well. Das and Butler were able to show that the VAPEX process was not susceptible to asphaltene plugging.

U.S. Pat. No. 5,899,274 (Frauenfeld et al.) teaches a solvent-aided method to mobilize viscous heavy oil by mixing at least two solvents, each soluble in oil, to form a substantially gaseous solvent mixture having a dew point that corresponds with the reservoir temperature and pressure. In this process, there is a reduced need to manipulate the reservoir temperature and pressure to provide conditions which would mobilize and recover oil from the reservoir.

Luhning et al. (CHOA Conference, Calgary, Canada, 1999) discusses the economics of the VAPEX process. Butler and Jiang (J. Can. Pet. Tech., 39(1): 48 2000) describe means to fine-tune VAPEX in the field.

There are many published results of the drainage rates for field conditions in the SAGD process, some examples include: Butler (Thermal Recovery of Oil and Bitumen, Grav-Drain Inc., Calgary, Alberta, 1997), Komery et al. (Paper 1998.214, Seventh UNITAR International Conference, Beijing, China, 1998), Saltuklaroglu et al. (Paper 99-25, CSPG and Petroleum Society Joint Convention, Calgary, Canada, 1999), Butler et al. (J. Can. Pet. Tech., 39(1): 18, 2000).

Canadian Patent No. 1,059,432 (Nenninger) deals with reducing the viscosity of heavy hydrocarbons in oil sand with a pressurized solvent gas such as ethane or carbon dioxide. The solvent gas temperature is maintained below its critical temperature at a pressure between 95% of its saturation pressure and not more than its saturation pressure.

Canadian Patent No. 2,323,029 (Nasr and Isaacs) describes a method (Expanding Solvent-SAGD, ES-SAGD) consisting of injecting steam and an additive into the reservoir. The additive can be one or a combination of C1 to C25 hydrocarbons and carbon dioxide, chosen so that its evaporation temperature is within about ±150° C. of the steam temperature at the operating pressure. After injection into the reservoir, a portion of the additive condenses in the reservoir. The concentration of additive in the steam is in the range from about 0.1% to about 5% liquid volume. The steam injection is continuous and hence the patent does not teach stopping the steam injection.

Canadian Patent No. 2,325,777 (Gutek et al.) describes a Combined Steam and Vapor Extraction Process (SAVEX) to recover hydrocarbons. First, steam is injected into an upper horizontal well until the upper surface of the steam chamber is located approximately 25% to 75% of the distance from the injection well to the top of the reservoir or the recovery rate of hydrocarbons from the reservoir is approximately 25 to 75% of the peak rate predicted for SAGD. Thereafter, a viscosity-reducing solvent is injected that is capable of existing in vapour form in the chamber to mobilize and recover an additional fraction of hydrocarbons.

Canadian Patent Application No. 2,391,721 (Nasr) describes an additional process for recovering hydrocarbons. A heated fluid composition (steam and/or hot water and a solvent) is injected into the formation. Suitable solvents include C1 to C30 hydrocarbons, carbon dioxide; carbon monoxide and associated combinations. The heated injection fluid composition has initially a steam+water-to-solvent volume ratio greater than or about 1. The steam+water-to-solvent volume ratio is subsequently reduced, at least once, to a different steam+water-to-solvent volume ratio which is still greater than or equal to about 1. The injected volume ratio of steam+liquid water-to-solvent is reduced as the process evolves. This process is referred to as Tapered Steam and Solvent-SAGD (TSS-SAGD). The same solvent is used throughout the process, only the ratio of water to solvent is altered as production progresses.

Das et al. (Paper 2004-264, CIPC Conference, Calgary, Canada, 2004) discuss the effect of solvent concentration on bitumen production in ES-SAGD and show through a simulation study that solvent concentrations in the injected stream greater than 15% volume of steam (CWE) give a marginal enhancement of process performance.

Despite the numerous attempts to recover bitumen and heavy oil in situ, as described above, there remains a need for a more cost-effective in situ bitumen extraction method. It is, therefore, desirable to provide a method capable of increasing the quantity of bitumen produced from a reservoir, or demonstrating an ability to remove bitumen more economically than is presently known. Accordingly, this invention satisfies this desire.

SUMMARY OF THE INVENTION

The invention relates generally to a method for recovering heavy hydrocarbons from an underground reservoir.

In one embodiment, the invention provides a method to recover heavy hydrocarbons from an underground reservoir, the underground reservoir being penetrated by an injection well and a production well, the method comprising the steps of injecting steam and a heavy hydrocarbon solvent into the injection well over time, while producing reservoir hydrocarbons from the production well; transitioning from the steam and heavy hydrocarbon solvent injections to a lighter hydrocarbon solvent injection, while continuing to produce hydrocarbons from the production well; and continuing to inject the lighter hydrocarbon solvent while producing hydrocarbons from the production well.

The heavy hydrocarbon solvent may include a hydrocarbon having 5 or more carbon atoms, or may include a mixture of hydrocarbon compounds each having 5 or more carbon atoms. Preferably, the heavy hydrocarbon solvent includes a C5 to C8 hydrocarbon, or a mixture of C5 to C8 hydrocarbons. Most preferably, the heavy hydrocarbon solvent is hexane or heptane.

The lighter hydrocarbon solvent may include a hydrocarbon having fewer than 5 carbon atoms. Preferably, the lighter hydrocarbon solvent is methane, ethane, propane, or butane, or a combination thereof.

Either or both of the heavy or the light hydrocarbon solvent may be any of the components that are normally found in gas condensates or diluent.

In an embodiment, the transitioning step includes transitioning the steam and heavy hydrocarbon solvent to zero while maintaining appropriate economic recovery rates.

In a further embodiment, the transitioning step is initiated after at least 10% and not more than 50% of the anticipated total reservoir volume has been recovered.

In a further embodiment, the transitioning step is completed after at least 10% and not more than 90% of the anticipated total hydrocarbon volume has been recovered.

The recovery method may include the additional step of monitoring and adjusting reservoir pressure to enhance the solubility of solvents and/or to ensure that a vapour chamber is created and maintained within the reservoir.

In an embodiment, the recovery method may include the additional step of recovering additional hydrocarbons from the reservoir during a blowdown phase performed after the lighter hydrocarbon solvent injection has been discontinued.

In another embodiment, a displacement gas may be injected into the well during the light hydrocarbon injection and/or during the blowdown phase. The displacement gas is preferably a noncondensible gas, such as nitrogen gas, natural gas, carbon dioxide, a gaseous combustion by-product, for example, a gaseous by-product that may be produced during steam generation, or a combination thereof

BRIEF DESCRIPTION OF THE DRAWINGS

Embodiments of the present invention will now be described by way of example only, with reference to the attached Figures, wherein.

DETAILED DESCRIPTION

With reference to the figures, a solvent-assisted vapor extraction with steam (SAVES) process for recovery of in situ bitumen or heavy oil is described. Generally, the present invention is a unique sequence of solvent/steam injections that achieves optimum and economical hydrocarbon production from a heavy hydrocarbon reservoir.

In general, heavy hydrocarbons remain more viscous at higher temperatures than light hydrocarbons at the same temperature, and heavy hydrocarbons also have higher dew points. Therefore, at lower temperatures and a given pressure, a light hydrocarbon will remain in the gaseous state, while a heavy hydrocarbon may be a viscous liquid at the same temperature and pressure. The effectiveness of a hydrocarbon to be used as a bitumen solvent will depend on the temperature and pressure conditions present within the reservoir and are important in the selection of an appropriate solvent.

Further, in a bitumen drainage recovery process, it is advantageous to "grow" a vapour chamber within the reservoir. Growing a vapour chamber is effective in ensuring that increasing volumes of accessible bitumen deposits within the reservoir are heated to reduce bitumen viscosity and improve mobility while maintaining sufficient pressure within the reservoir to maximize the solubility of the solvent in the heavy oil or bitumen.

Figure 2A:
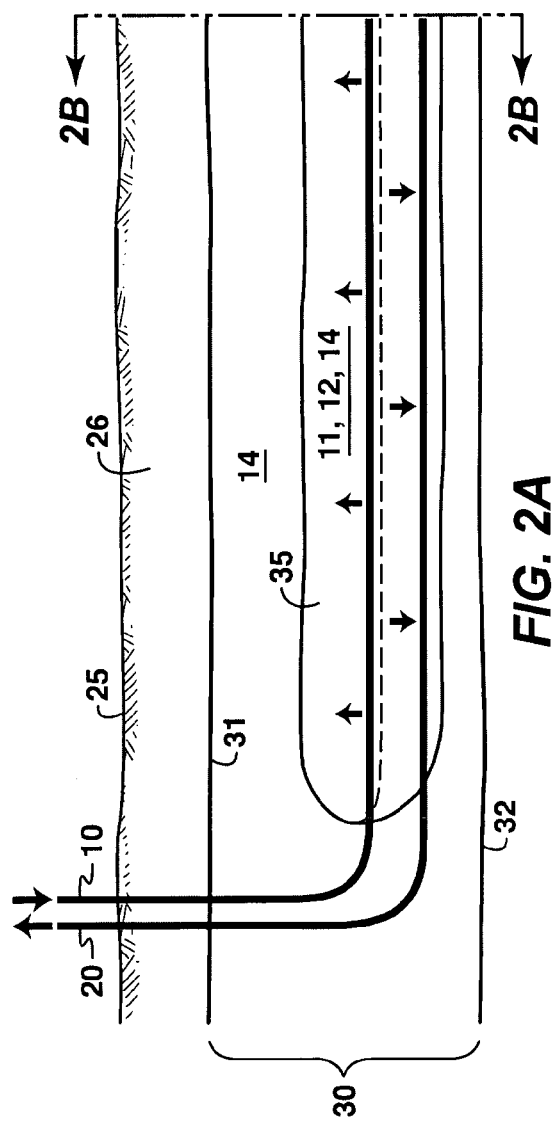
FIG. 2A is a schematic of a reservoir and horizontally drilled wells during the initial start up phase of the SAVES process, shown in a side cross sectional view.
Figure 2B:
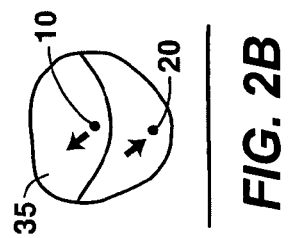
FIG. 2B is a schematic of a reservoir and horizontally drilled wells during the initial start up phase of the SAVES process, shown in an end cross sectional view.

In accordance with the invention, a horizontal injection well 10 and a horizontal production well 20 are drilled into a reservoir 30 at horizontally spaced locations as shown in FIGS. 2A and 2B, with the injection well 10 above, and preferably in vertical alignment with, the production well 20. A condition-specific sequence of steam 11 and solvents are injected through the injection well 10 and into the reservoir 30, to reduce the viscosity of bitumen and heavy oil 14 within the reservoir, thereby allowing the viscosity-reduced heavy oil or bitumen 14 to be mobilized by gravity and to drain into the production well 20 for production to the surface 25.

Figure 1:
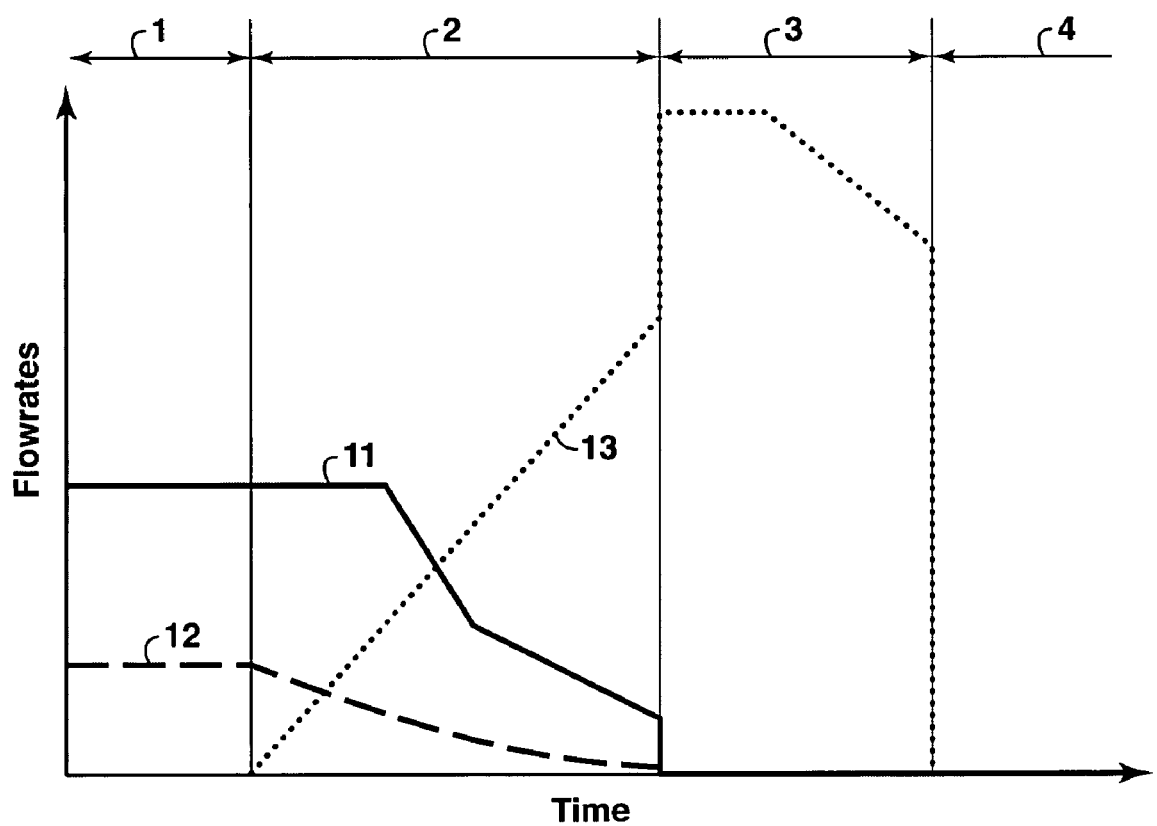
FIG. 1 is a graph showing a sample injection schedule in accordance with the SAVES process.

With reference to FIG. 1, in a typical SAVES process, four distinct production phases are performed. In the first phase 1, steam 11 and a heavy hydrocarbon solvent 12 are injected into the reservoir 30 through the injection well 10 penetrating the reservoir 30. In the second phase 2, a transition phase, the injections of steam 11 and heavy solvent 12 are reduced and discontinued, while a lighter hydrocarbon solvent 13 is injected. The third phase 3 continues with exclusive injection of the lighter solvent 13. Finally, a fourth phase 4, the blowdown, may follow to recover additional solvent 12, 13 and heavy hydrocarbon that remains in the reservoir.

Each phase of the SAVES process is designed to achieve the most economical recovery of bitumen 14. Hydrocarbon production from the production well is initiated during phase 1 and continues through phase 3, and 4 if present.

The preferred higher molecular weight solvents 12 for use in the SAVES process include C5+ hydrocarbons, for example pentane, hexane, heptane, octane, nonane, and decane or any one or more components normally present in gas condensates or diluent. Preferably, the higher molecular weight solvent 12 is hexane or heptane, or is a mixture of C5 to C8 hydrocarbons including any of the components that may normally be present in gas condensates or diluent. The preferred low molecular weight solvents 13 preferably include C1 to C4 hydrocarbons, for example methane, ethane, propane, and butane. Preferably the low molecular weight solvent 13 is ethane or propane, or is a mixture of C1 to C4 hydrocarbons. It should be noted that when selecting appropriate solvents 12, 13 during the SAVES process, the solvents 12, 13 are selected such that each solvent 12, 13 exists in substantially a vapour state at the conditions experienced during the particular phase in which that solvent is used. Preferably, one solvent should be of higher molecular weight than the other, and the higher molecular weight solvent 12 should be injected substantially with the steam 11 during phase 1 of the process, while the lower molecular weight solvent 13 should be injected once the injection of steam 11 has been reduced or discontinued.

It should be noted that when referring to volumes of solvent, volumes are expressed as a ratio of liquid hydrocarbon to total liquid injected, and steam volume is expressed in terms of the volume of cold water required to produce the steam volume.

Phase 1— Steam and Heavy Hydrocarbon Injection:

With reference to FIGS. 2A and 2B, the growth of the vapour chamber 35 is shown during phase 1. In this phase, steam 11 is injected into the reservoir 30 through an injection well 10 that penetrates the surface of the earth 25, the overburden 26, and the reservoir 30. The reservoir 30 is bounded by a reservoir top 31 and bottom surface 32. The steam enters the vapour chamber 35 within the reservoir 30, thereby applying heat and pressure to the reservoir 30. The steam 11 alone will aid in the recovery of a certain amount of bitumen 14, as in the SAGD process. The addition of a small amount, for example between 0.1 and 15 volume percent, of heavy hydrocarbon solvent 12 will provide further bitumen 14 mobilization, as the heavy hydrocarbon solvent 12 dissolves into the bitumen 14, thereby reducing the viscosity of the heavy oil or bitumen 14 such that it flows to the production well 20. The solvent 12 will also serve to dilute the produced heavy oil or bitumen 14 to help realize the fluid property specifications required for transport by pipeline. Preferably, the solvent 12 is from 1 to 10 volume %, and most preferably, between 3 and 8 volume %.

The heavy hydrocarbon solvent 12 is most preferably a C7 hydrocarbon having an evaporation temperature similar (within approximately 50° C.) to the saturation temperature of the steam 11 at the process operating pressure. During phase 1, a fraction of the reservoir bitumen 14, for example between 10 and 50 percent of the anticipated total recovered bitumen or heavy oil, will be recovered from the reservoir.

Furthermore, in phase 1, and as stated previously, it is economically advantageous to reduce the length of the injection of steam 11 interval as much as is practical. The injection of steam 11 of the SAVES process, therefore, is preferably maintained for a period of time that is sufficient to ensure that the vapour chamber 35 grows to a size that is large enough to sustain the required solvent-induced drainage rates for the remaining phases of production.

Available computer reservoir simulation models provide the ability to predict production rates and vapour chamber 35 dimensions to assist in the estimation of the length of the phase 1 interval. Preferably, phase 1 continues until a peak in hydrocarbon production is observed. This would typically reflect a cumulative volume of produced heavy oil or bitumen 14 that equalled or exceeded 10 to 50 percent of the anticipated total recovered volume.

Figure 2C:
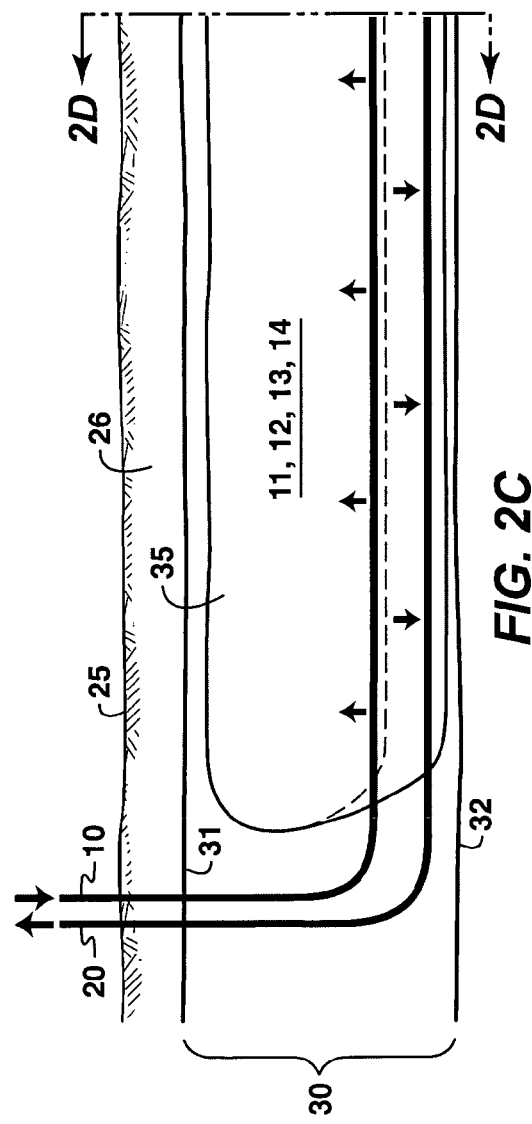
FIG. 2C is a schematic cross section of a reservoir and horizontally drilled wells during the transition phase of the SAVES process, shown in a side cross sectional view.
Figure 2D:
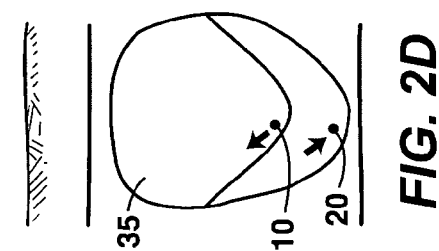
FIG. 2D is a schematic cross section of a reservoir and horizontally drilled wells during the transition phase of the SAVES process, shown in an end cross sectional view.

Phase 2—Transition:

FIGS. 2C and 2D are illustrations of a transition phase wherein like elements from FIG. 2A are given the same reference numerals. With reference to FIG. 2b, once a sufficient amount of steam 11 has been injected, the start-up phase 1 is followed by a transition phase 2, in which the injections of higher molecular weight solvent 12 and steam 11 are replaced by an injection of lower molecular weight solvent 13. During phase 2, the effects of the injection of steam 11 slowly dissipate, and the reservoir temperature will drop. However, the integrity of the vapour chamber 35 is maintained by the addition of the injection of light hydrocarbon solvent 13, with gaseous light hydrocarbon solvent 13 replacing steam 11 in the vapour chamber 35. The transition phase 2 also sustains the hydrocarbon production rates of phase 1, while increasing the concentration of light hydrocarbon solvent 13 in the bitumen 14 to continue the mobilization and production of heavy oil or bitumen 14 in Phase 3.

Generally, the relative rates of decreasing the injection of steam 11 and heavy hydrocarbon solvent 12, and increasing the injection of light hydrocarbon solvent 13 are controlled to maintain chamber pressure within an acceptable range while preserving the economics of recovery. In most situations, the transitioning step should be gradual, and is initiated after approximately 10% to 50% of the anticipated total reservoir hydrocarbon volume has been recovered. The transition phase (gradual cessation of the injections of steam 11 and heavy hydrocarbon solvent 12, and gradual initiation of the injection of light hydrocarbon solvent 13) is generally completed after 10% to 90% of the total reservoir hydrocarbon volume has been recovered.

Figure 2F:
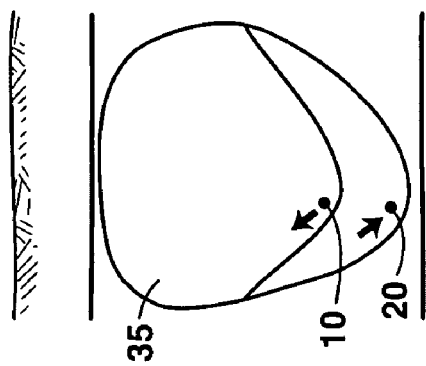
FIG. 2F is a schematic cross section of a reservoir and horizontally drilled wells during the light hydrocarbon solvent phase of the SAVES process, shown in an end cross sectional view.
Figure 2E:
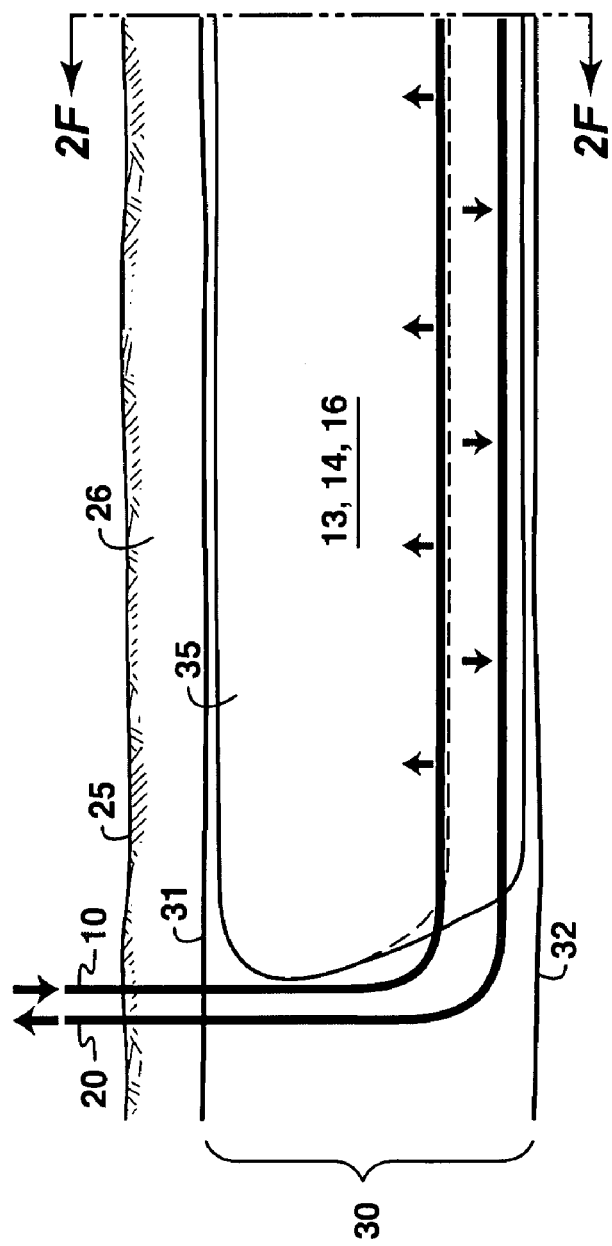
FIG. 2E is a schematic cross section of a reservoir and horizontally drilled wells during the light hydrocarbon solvent phase of the SAVES process, shown in a side cross sectional view.

Phase 3—Light Hydrocarbon Injection:

FIGS. 2E and 2F are illustrations of a light hydrocarbon injection phase wherein like elements from FIGS. 2A, 2B, 2C and 2D are given the same reference numerals. In FIG. 2F, a reservoir 30 is depicted during the injection of light hydrocarbon solvent 13 in phase 3.In this phase, the vapour chamber 35 has grown initially due to the injection of steam 11, but the injections of steam 11 and heavy hydrocarbon solvent 12 have been terminated and the volume of steam 11 in the vapour chamber 35 has been replaced by gaseous light hydrocarbon solvent 13. As the temperature continues to drop, the light hydrocarbon solvent 13 continues to condense, and solubilize additional volumes of heavy oil or bitumen 14 present in the reservoir 30. At this point, a noncondensible displacement gas 16 may be introduced into the reservoir 30 to maintain the pressure of the vapour chamber 35.

Preferably, the injection of displacement gas 16 is initiated during phase 2 or 3, at which time the temperature and pressure within the reservoir 30 are decreasing, and introduction of the displacement gas 16 will not cause significant variation in the viscosity of the solvent-heavy oil and solvent-bitumen mixtures. Examples of acceptable displacement gases 16 include nitrogen, natural gas, methane, carbon dioxide, and gas produced as a by-product of the burning of natural gas or other fuel for steam 11 generation.

The transition phase 2, should take place over the time interval over which 10 to 80 percent of the anticipated total recoverable volume of bitumen or heavy oil 14 has been produced, and those skilled in the art will understand that the reduction and stoppage of injections of steam 11 and heavy hydrocarbon 12 will affect the reservoir conditions of temperature and pressure, and therefore, the lighter hydrocarbon solvent 13 should be injected at an appropriate rate and quantity to avoid compromising the vapour chamber 35. The transition interval can be appropriately planned using available computer software known to those in the field, and taking into consideration the desired efficiency of hydrocarbon recovery. For example, prior to initiating the SAVES process, a computer simulation of the recovery would be used to assist in planning the times and rates associated with each phase.

In certain situations, a shorter injection of steam 11 may be beneficial, such as when reduced cost is more desirable than maximal recovery of reservoir hydrocarbons. Alternatively, if time for recovery is the driving factor, the injection of steam 11 and heavy hydrocarbon 12 may be maintained, delaying the transition interval 2, or the transition interval 2 may be lengthened.

The transition from a high molecular weight solvent 12 to a lighter solvent 13 exploits the evolving conditions of temperature and pressure within the reservoir 30 caused by the initiation and cessation of the injection of steam 11, while reducing heat losses to the overburden. Moreover, the SAVES process may provide reduced capital and operating costs due to a reduction in the amount of steam 11 required, and also due to the inherent dilution of the bitumen 14 by the injected solvents 12, 13, reducing the need for dilution at the surface 25 prior to pipeline transport. Therefore, the SAVES process delivers equivalent or improved bitumen or heavy oil 14 production to known methods, with a more favourable economic return. The SAVES process also captures the benefits of lower energy consumption, less environmental pollution, in situ upgrading, and lower capital costs.

Phase 4—Blowdown:

As noted above, the process may be followed by a blowdown phase 4, in which production is continued at reducing reservoir pressures after hydrocarbon injection is complete, in order to recover additional volumes of solvent 12, 13 that can be subsequently used in adjacent active injection wells, or used as a fuel to generate steam 11. Furthermore, the production fluids can also consist of additional volumes of produced bitumen or heavy oil 14.

Figure 3:
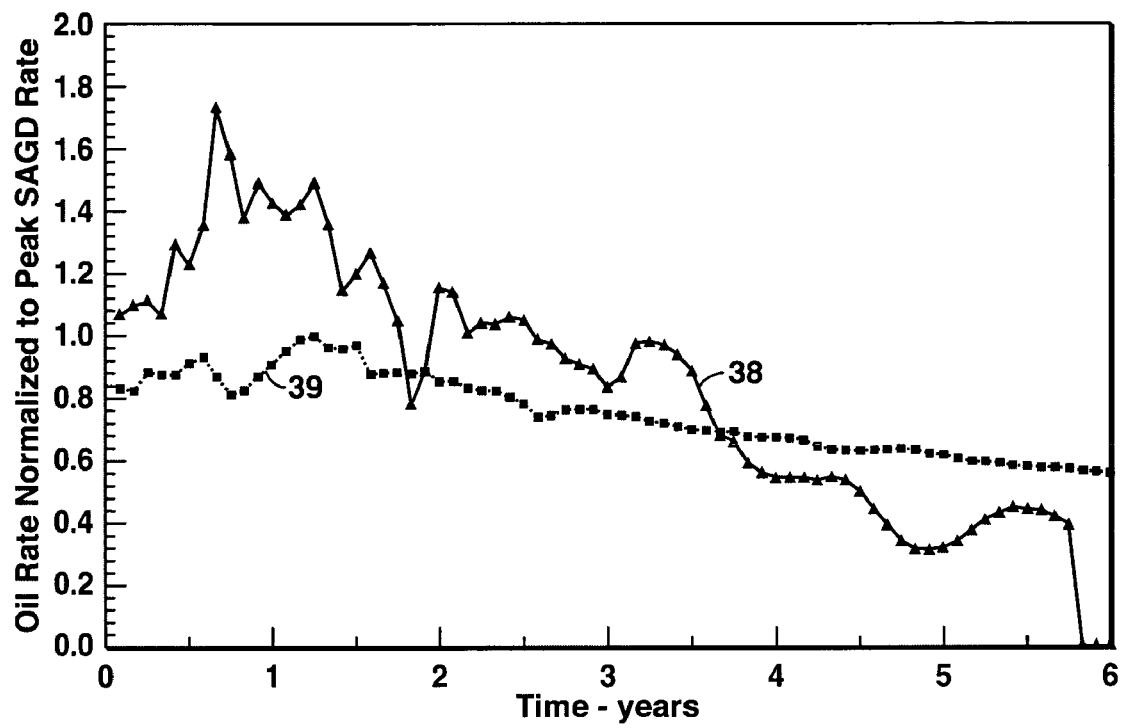
FIG. 3 is a graphical representation of the field scale production rates predicted from numerical models of the SAGD and SAVES processes.
Figure 4:
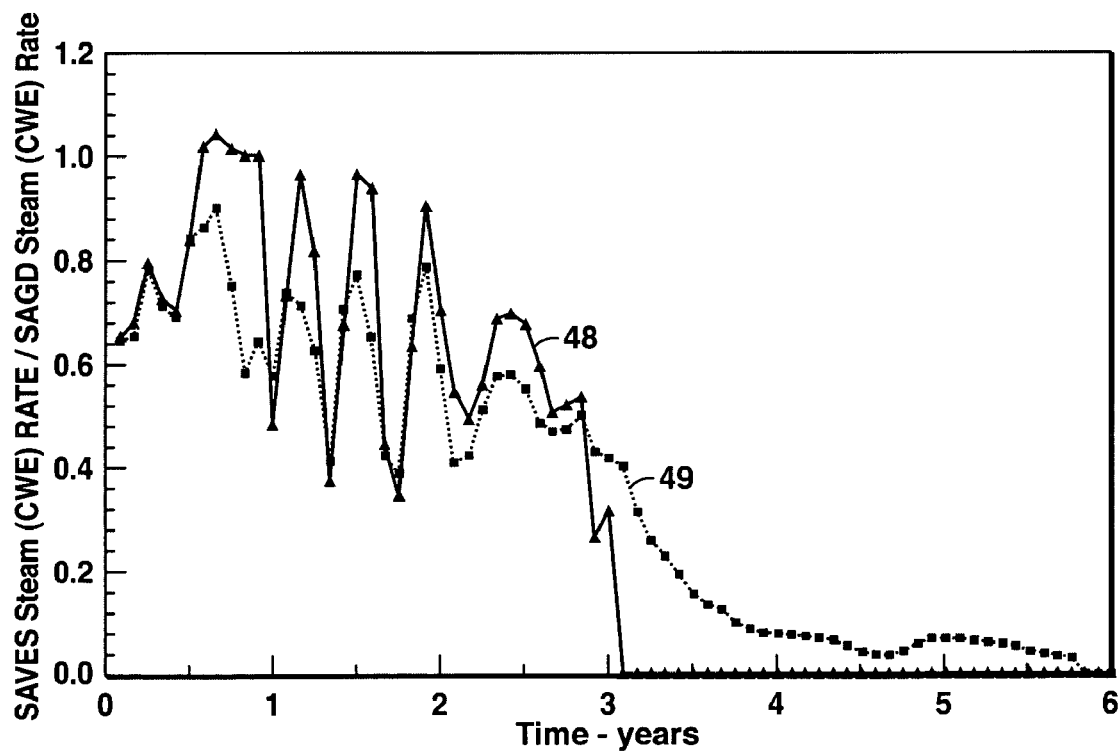
FIG. 4 is a graphical representation of the steam requirements of the SAVES process as a fraction of the SAGD steam requirements over the time of production.
Figure 5:
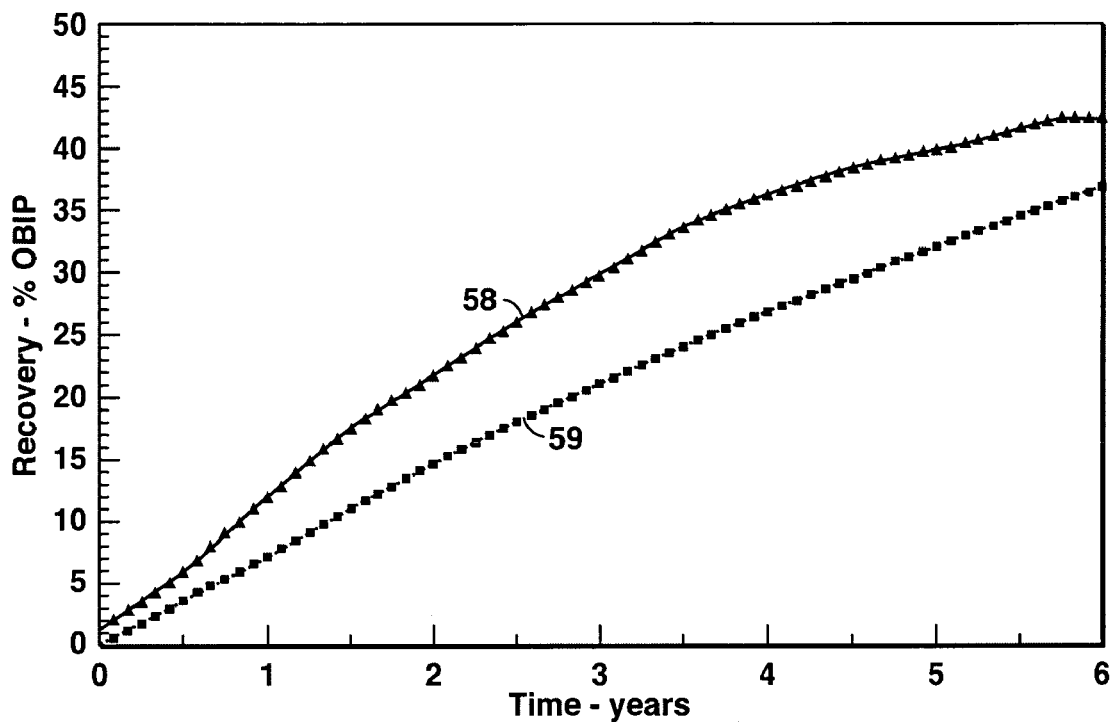
FIG. 5 is a graph comparing the bitumen recovery as a function of time between the SAGD process and the SAVES process.
Figure 6:
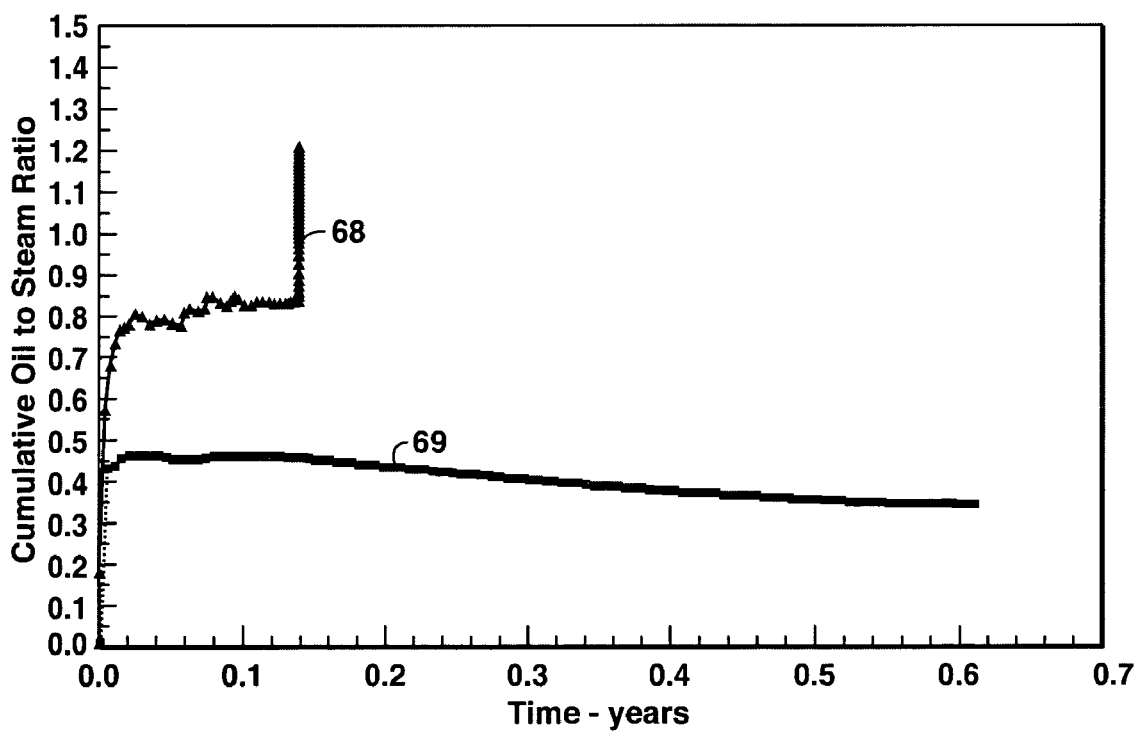
FIG. 6 is a graph showing the oil/steam ratio of the SAVES process as compared to the SAGD process.

FIG. 3 is a graphical representation of field scale numerical model predictions comparing results of the application of the SAVES process 38 with those of the prior art SAGD process 39 normalized to the maximum producing rate observed for SAGD. FIG. 4 plots the steam 11 required by the SAVES process 48 as a fraction of the steam 11 needed by the SAGD process 49. FIG. 5 shows a graph of the cumulative bitumen 14 recovered in the SAVES 58 and SAGD processes 59. FIG. 6 displays a comparison of the oil-to-steam ratio, and is a comparative indicator of the potential economics of the processes of interest, SAVES 68 and SAGD 69.

The above-described embodiments of the present invention are intended to be examples only. Alterations, modifications and variations may be effected to the particular embodiments by those of skill in the art without departing from the scope of the invention, which is defined solely by the claims appended hereto.

The invention claimed is:

1. A method to recover heavy hydrocarbons from an underground reservoir, the underground reservoir being penetrated by an injection well and a production well, the method comprising the steps of:

(a) injecting steam and a heavy hydrocarbon solvent into the injection well over time, while producing reservoir hydrocarbons from the production well;

(b) transitioning from the steam and heavy hydrocarbon solvent injections to a lighter hydrocarbon solvent injection, while continuing to produce hydrocarbons from the production well;

(c) continuing to inject the lighter hydrocarbon solvent while producing hydrocarbons from the production well; and (d) enhancing the solubility of solvents in steps (a) through (c) by monitoring and adjusting reservoir pressure.

2. The method of claim 1 further comprising the step of monitoring and adjusting reservoir pressure to ensure that a vapour chamber is created and maintained within the reservoir during steps (a) through (c).

3. The method of claim 1 wherein in step b) the steam and heavy hydrocarbon solvent injection are transitioned to zero while maintaining appropriate economic recovery rates.

4. The method of claim 1 in which a displacement gas is injected into the injection well in step (c).

5. The method of claim 4 wherein the displacement gas is chosen from the group consisting of nitrogen, natural gas, methane, carbon dioxide, gaseous combustion by-product, and any combination thereof.

6. A method according to claim 1 in which at least a portion of the heavy hydrocarbon solvent comprises a $C_5$ to $C_8$ hydrocarbon.

7. A method according to claim 1 wherein at least a portion of the heavy hydrocarbon solvent comprises a hydrocarbon compound having at least 5 carbon atoms.

8. A method according to claim 1 wherein the heavy hydrocarbon solvent is a C5 to C8 hydrocarbon.

9. A method according to claim 1 wherein the heavy hydrocarbon is selected from the group consisting of hexane, heptane, and any combination of hexane and heptane.

10. A method according to claim 1 wherein the heavy hydrocarbon solvent is a gas plant condensate or diluent.

11. A method according to claim 1 wherein the lighter hydrocarbon solvent comprises a hydrocarbon having fewer than 5 carbon atoms.

12. A method according to claim 1 in which the lighter hydrocarbon solvent is selected from the group consisting of methane, ethane, propane, butane, and any combination thereof.

13. A method according to claim 1 further comprising step (e) ceasing light hydrocarbon solvent injection while continuing to produce additional hydrocarbons from the reservoir.

14. A method according to claim 13 wherein a displacement gas is injected during step (e).

15. A method according to claim 14 wherein the displacement gas is selected from the group consisting of nitrogen gas, natural gas, methane gas, carbon dioxide, and any combination thereof.

16. A method according to claim 1 wherein step (b) is initiated after at least 10 and not more than 50% of an anticipated total reservoir hydrocarbon volume has been recovered.

17. A method according to claim 1 wherein step (c) is initiated after at least 10 and not more than 90% of an anticipated total reservoir hydrocarbon volume has been recovered.

* * * * *